United States Patent [19]
Cahill et al.

[11] Patent Number: 5,500,938
[45] Date of Patent: Mar. 19, 1996

[54] METHOD AND APPARATUS FOR DIRECTLY SELECTING AND SIGNALLING START AND STOP TIMES IN AN ELECTRONIC CALENDAR

[75] Inventors: Leslie M. Cahill, Grapevine; David R. Miller, Keller; David J. Schell, Trophy Club, all of Tex.

[73] Assignee: International Business Machines, Corporation, Armonk, N.Y.

[21] Appl. No.: 207,334

[22] Filed: Mar. 7, 1994

[51] Int. Cl.⁶ .................................................. G06F 3/00
[52] U.S. Cl. .................. 395/161; 395/159; 395/155
[58] Field of Search ...................... 364/705.07–705.08, 364/401–403; 395/155–161

[56] References Cited

U.S. PATENT DOCUMENTS

| | | | |
|---|---|---|---|
| 4,896,291 | 1/1990 | Gest et al. | 395/156 |
| 5,016,170 | 5/1991 | Pollalis et al. | 364/401 X |
| 5,023,851 | 6/1991 | Murray et al. | 395/161 |
| 5,129,057 | 7/1992 | Strope et al. | 395/161 |
| 5,181,273 | 1/1993 | Ohtani | 395/161 |
| 5,287,448 | 2/1994 | Nicol et al. | 395/159 |
| 5,323,314 | 6/1994 | Baber et al. | 395/155 X |
| 5,365,360 | 11/1994 | Torres | 395/159 |
| 5,375,199 | 12/1994 | Harrow et al. | 395/159 |
| 5,384,910 | 1/1995 | Torres | 395/156 |
| 5,385,475 | 1/1995 | Sudman et al. | 434/118 X |
| 5,388,197 | 2/1995 | Rayner | 395/161 |
| 5,428,736 | 6/1995 | Kahl et al. | 395/159 |
| 5,434,965 | 7/1995 | Matheny et al. | 395/159 |
| 5,436,637 | 7/1995 | Gayraud et al. | 395/155 X |
| 5,440,681 | 8/1995 | Kudo | 395/161 |
| 5,442,744 | 8/1995 | Piech et al. | 395/159 X |

OTHER PUBLICATIONS

Desk Set Environment Reference Guide, Sun Microsystems, Inc., 1990, pp. 93–125.
Myers, "A Taxonomy of Window Manage User Interfaces", IEEE, 1988, pp. 65–84.
Microsoft Schedule+, Microsoft Corp., 1992, screen pp. 1–5.

*Primary Examiner*—Raymond J. Bayerl
*Assistant Examiner*—John E. Breene
*Attorney, Agent, or Firm*—A. Bruce Clay

[57] ABSTRACT

A pointer associated with a computer pointing device is used to give instructions to the user of a computer program as to what actions are expected/required from the user. Upon placing the pointer in a predesignated action area of a panel of the computer program, the pointer is automatically changed to an action required pointer to indicate what the user is expected and/or required to do. Additionally, the pointer is used to directly designate a time, for example, a start and/or stop time for an event to be scheduled on an electronic calendar program. By placing the pointer at the appropriate time on a time line and activating the pointing device, the time is selected.

14 Claims, 6 Drawing Sheets

FIG. 8

EVENT DEFINITION

|     | Su | Mo | Tu | We | Th | Fr | Sa |
|-----|----|----|----|----|----|----|----|
|     |    | 1  | 2  | 3  | 4  | 5  | 6  |
|     | 7  | 8  | 9  | 10 | 11 | 12 | 13 |
|     | 14 | 15 | 16 | 17 | 18 | 19 | 20 |
|     | 21 | 22 | 23 | 24 | 25 | 26 | 27 |
|     | 28 | 29 | 30 |    |    |    |    |

◁ NOV ▷
◁ 1993 ▷

SELECTED DATE
NOV 02, 1993

EVENT OWNER . . . . . . . . . . . . . LESLIE M. CAHILL

TYPE:

8a 10a 12p 2p 4p
8a 10a 12p 2p 4p

10:00am ⇒ 12:00pm

PEOPLE /RESOURCES...

FREE TIME SEARCH...

REPEATING....

ALARM....

SUBJECT

DESCRIPTION:

VIEWING RIGHTS:

PUBLIC

OK/CLOSE    OK/NEW    CANCEL    HELP

METHOD AND APPARATUS FOR DIRECTLY SELECTING AND SIGNALLING START AND STOP TIMES IN AN ELECTRONIC CALENDAR

TECHNICAL FIELD OF THE INVENTION

This invention relates in general to computer software, and in particular to a method and apparatus for signalling the user through a changing cursor and directly specifying the start and stop times for meetings scheduled on an electronic calendar.

BACKGROUND OF THE INVENTION

The use of electronic calendar programs is becoming more common in the work place and at home. Electronic calendars allow a user to keep track of daily activities and upcoming events on their computer. One of the most common tasks performed with an electronic calendar is the scheduling and/or addition of a meeting/event to the calendar of the user. Typically, a schedule event panel is presented to the user for entering required data such as, for example, the title of the event, and the start/stop time of the event, where the event will be held, who is to attend, and etc.

With the increased usage of pointing devices such as the mouse, it is becoming more popular to be able to select with the mouse pointer rather than having to enter information with the keyboard. However, in order to enter start and stop times for an event, conventional methods in electronic calendars currently include the use of spin buttons, direct entry with a keyboard, or slider bars. Each of the current methods requires multiple steps for entering one piece of information. In addition, the format required by many programs requires the designations A.M. and P.M. which adds further steps to the process. Thus, there is a need for a quick and simple way to allow direct selection of a time for the start/stop time of an event with a mouse pointer as well as to signal the user as to what needs to be done for the selection.

SUMMARY OF THE INVENTION

The present invention disclosed herein comprises a method and apparatus for directly specifying and signalling start and stop times in an electronic calendar. The present invention allows a user to point and select a time and provides the user with helpful information on what is required.

In accordance with one aspect of the present invention, a method is provided for selecting and signalling a start time and a stop time for an event being scheduled by a user on an electronic calendar of a computer system. The computer system includes a pointing device such as, for example, a mouse. The user positions a pointer associated with the pointing device in a predesignated time selection area of the calendar. A desired start time is selected along a time line of the electronic calendar device by activating the pointing device. New user oriented instructions are then automatically displayed on the pointer. The pointer is then placed at the desired stop time. Again, the user selects the time by activating the pointing device.

After the start time has been selected, a start flag may be automatically placed along the time line. Similarly, a stop flag may be placed along the time line after the stop time is selected. The start and/or stop time may then be changed by dragging and dropping the appropriate flag.

It is a technical advantage of the present invention in that a user is able to quickly and easily select a start and stop time for an event without having to take several steps. In addition, it is a technical advantage of the present invention that a user is provided with guides for what is expected/required of the user.

BRIEF DESCRIPTION OF THE DRAWINGS

For a more complete understanding of the present invention and the advantages thereof, reference is now made to the Detailed Description taken in conjunction with the attached Drawings, in which:

FIG. 8 illustrates a further embodiment of the present invention; and

DETAILED DESCRIPTION OF THE INVENTION

Figure 1:
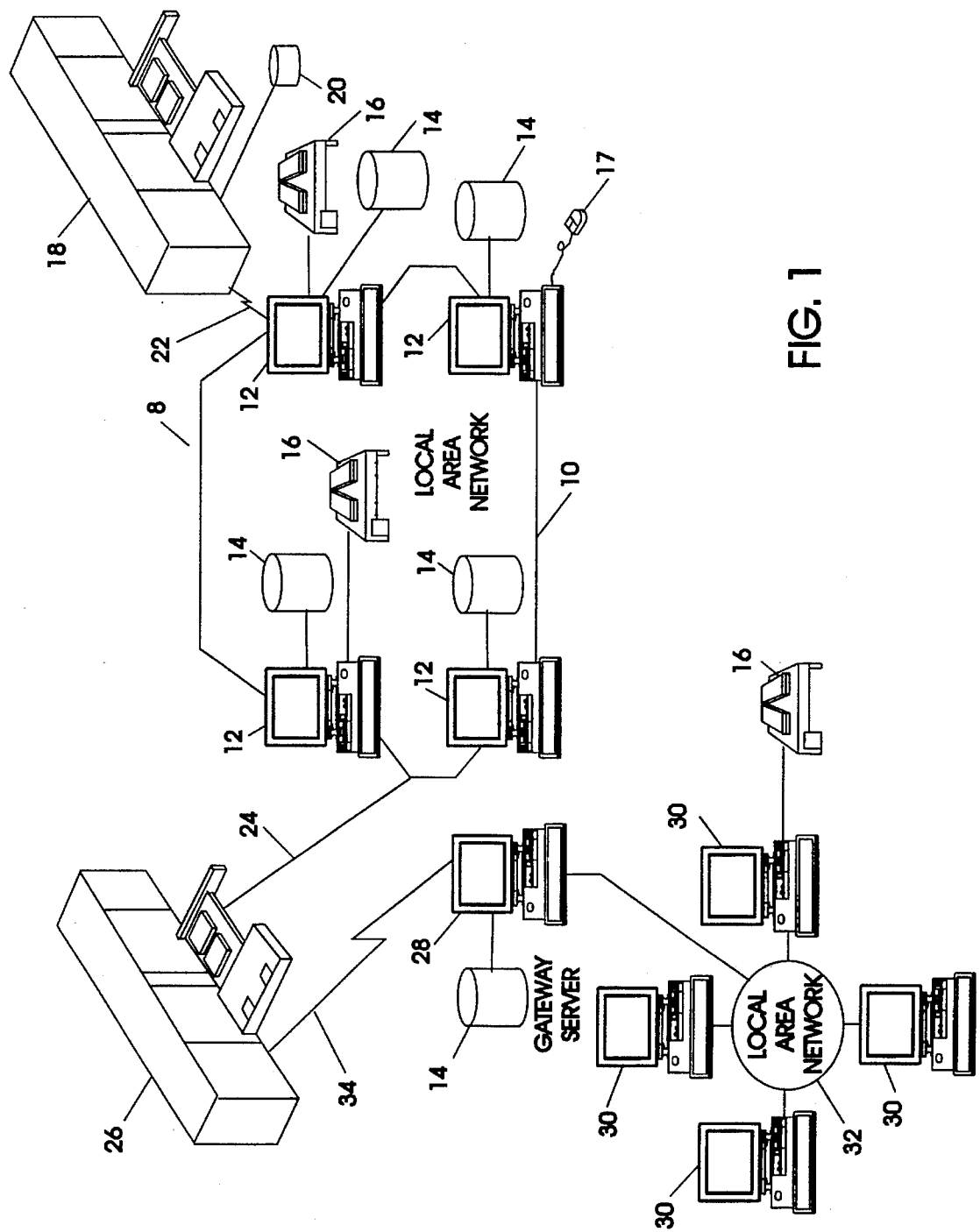
FIG. 1 is a schematic illustration of a data processing system in accordance with the present invention.

Referring to FIG. 1, there is depicted a graphical representation of a data processing system 8, which may be utilized to implement the present invention. As may be seen, data processing system 8 may include a plurality of networks, such as local area networks (LAN) 10 and 32, each of which preferably includes a plurality of individual computers 12 and 30, respectively. Of course, those skilled in the art will appreciate that a plurality of intelligent workstations (IWS) coupled to a host processor may be utilized for each such network. As is common in such data processing systems, each individual computer may be coupled to a storage device 14 and/or a printer/output device 16. In addition, each individual computer may be provided with a pointing device such as, for example, a mouse 17. It is to be understood that other pointing devices such as a stylus, light pen, etc. may be used as well.

The data processing system 8 may also include multiple mainframe computers, such as mainframe computer 18 which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a subsystem control unit/communications controller 26 and communications link 34 to a gateway server 28. The gateway server 28 is preferably an individual computer or IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California, while LAN 10 may be located within Texas, and mainframe computer 18 may be located in New York.

Figure 2A:
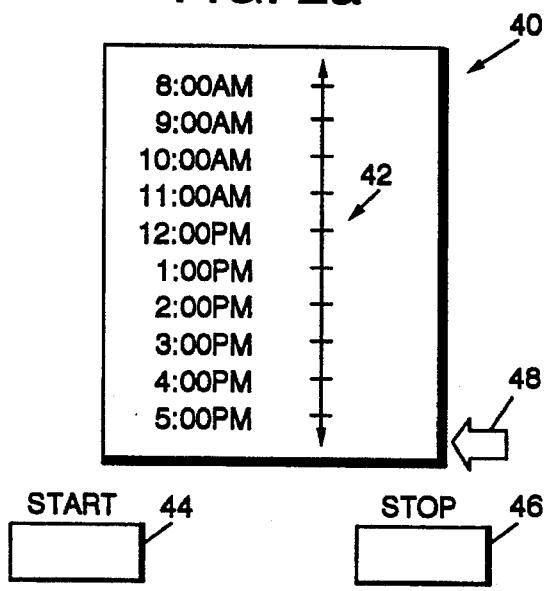
FIGS. 2–4 illustrate one embodiment of the present invention.
Figure 2B:
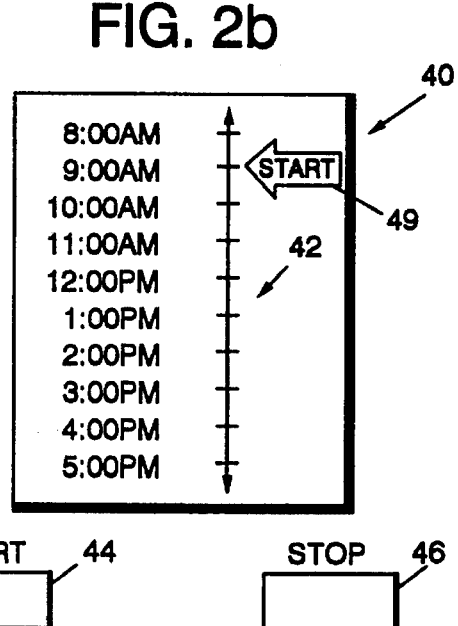
Figure 3:
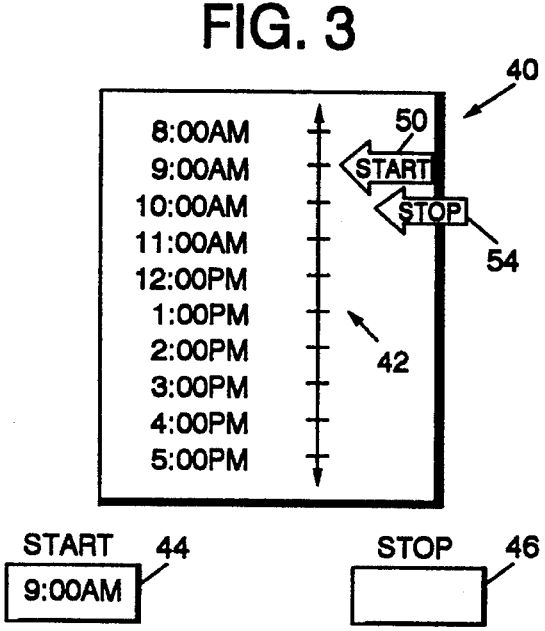
Figure 4:
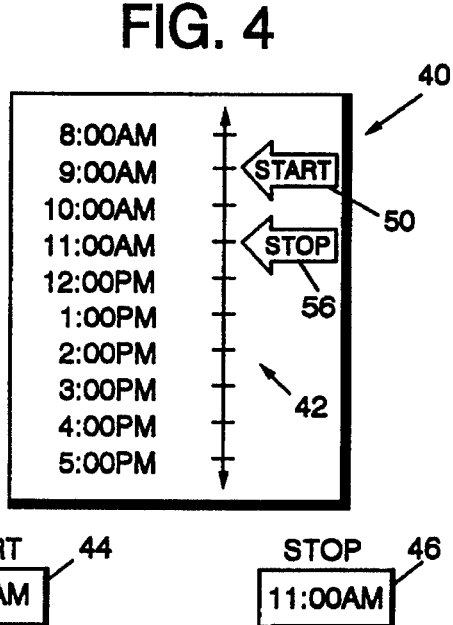

Referring next to FIGS. 2–4, one embodiment illustrating the present invention is shown. Referring first to FIG. 2a, there is shown an event time area, generally identified by the reference numeral 40, which may be used, for example, to set a start/stop time for an electronic calendar event on, for example, the computer 12 or 30 as shown in FIG. 1. The event time area 40 comprises a time line 42 and may include a start field 44 and a stop field 46. In the example shown, the time line 42 starts at 8:00 AM, ends at 5:00 PM, and has one hour time increments. It will be readily apparent to those skilled in the art that the time line 42 may be scrollable by the user in addition to being provided with default and/or user adjustable settings. A pointer 48 such as from a mouse may be used with the event time area 40, as will be subsequently described.

Referring next to FIGS. 2b and 3, when setting the time for a calendar event, a user will move the pointer 48 into the event time area 40. Upon entering the area 40, the pointer 48 is changed into an action required/start pointer 49 which serves to inform the user that the selection of a start time is expected and/or required. The user then places the start pointer 49 adjacent the time line 42 and activates a pointing device (such as the control buttons shown on the mouse 17, see FIG. 1). By positioning the pointer 49 on a time such as, for example, 9:00 a.m. and clicking, the pointer 49 changes to a start flag 50 which appears adjacent the selected time on the time line 42 (see FIG. 3). Simultaneously, the selected start time (9:00 a.m.) appears in the start field 44. The pointer 48 (see FIG. 2a) will then automatically change to an action required/stop pointer 54 to indicate that a stop time needs to be selected.

Referring to FIG. 4, the user has selected, for example, 11:00 a.m. as the stop time by positioning the stop pointer 54 (see FIG. 3) adjacent to 11:00 a.m. on the time line 42 and clicking. The stop pointer 54 is then positioned on the time line 42 and changed to a stop flag 56 as shown in FIG. 4. Simultaneously, the stop time (11:00 a.m.) appears in the stop field 46. Thus, a user is able to select a start and stop time for a scheduled event which appears both graphically for visual awareness as well as numerically for those that prefer such data. This selection, as described above, is both simple to use and easy to understand as it is aided by the use of a changing mouse pointer.

If the user wishes to change the stop and/or start times, there are several options available with the present invention. The user may drag and drop the start flag 50 and/or the stop flag 56 to a new time. Alternatively, the user may use a keyboard to edit the numerical information in the start field 44 and/or the stop field 46 which will also be indicated by repositioning of the flags 50 and 56.

Figure 5:
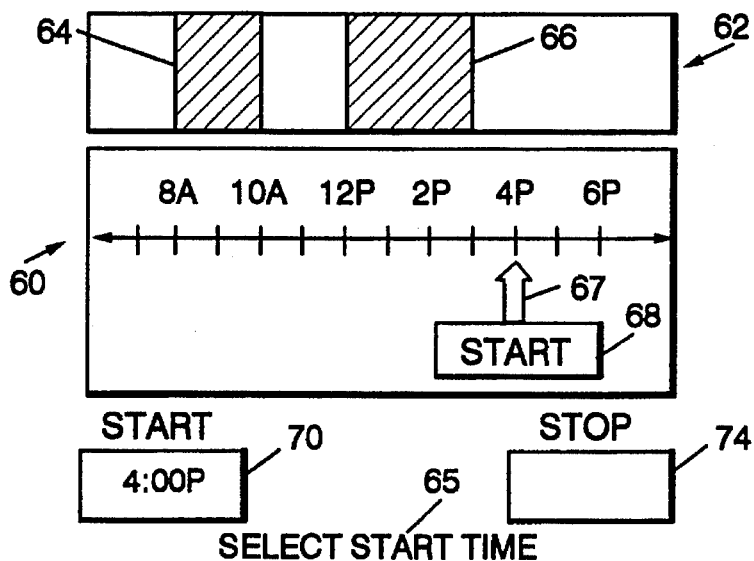
FIGS. 5–7 illustrate another embodiment of the present invention.
Figure 6:
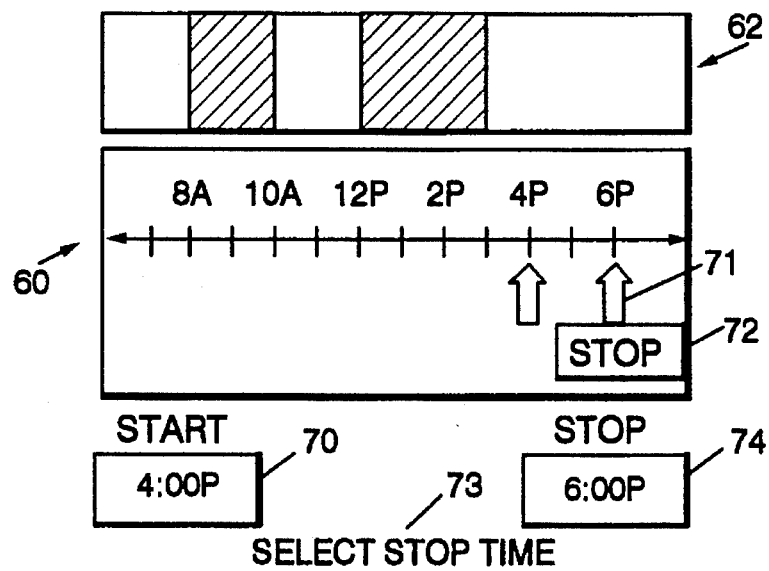
Figure 7:
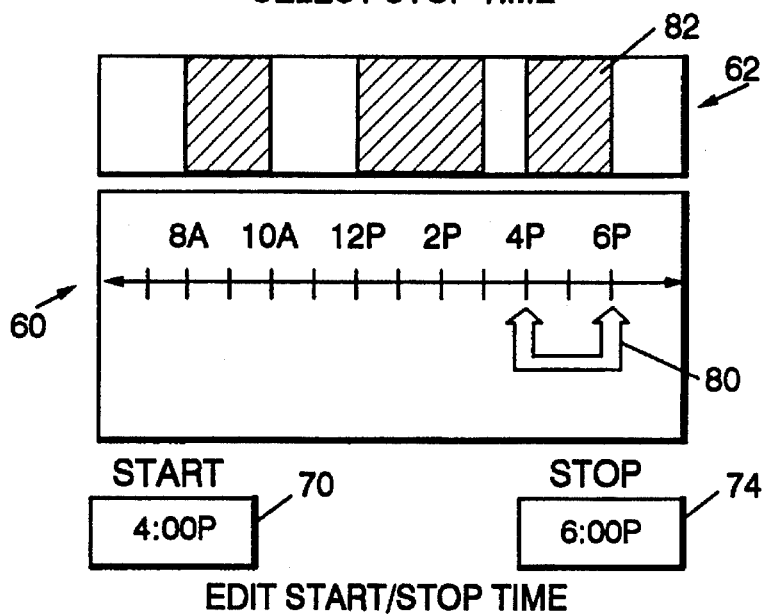

Referring next to FIGS. 5, 6, and 7, an alternative embodiment of the present invention is shown. In conjunction with a time line 60, a busy bar area 62 is provided. The busy bar area 62 provides a plurality of busy bars such as, for example, bar 64 and bar 66, as shown in FIG. 5, to graphically show activities previously scheduled. The bar 64 shows an activity scheduled from 8:00 a.m. to 10:00 a.m., while the bar 66 shows an activity scheduled from 12:00 p.m. to 3:00 p.m. As with the embodiment shown in FIGS. 2, 3, and 4, the embodiment shown in FIG. 5 is implemented by positioning a pointer (not shown) adjacent a start time on the time line 60 and activating on an appropriate control such as a mouse button.

Upon initiation of the selection process as shown in FIGS. 5, 6, and 7, a "Select Start Time" notice 65 may appear to inform the user of what is required. By activating the pointing device control, the pointer is changed to a start pointer 67 which includes a start flag 68 both of which are positioned along the time line 60 adjacent the selected start time (as shown, 4:00 P). Simultaneously, the time as selected on the time line 60 appears in a start field 70. The notice 65 may then change to a "Select Stop Time" notice 73 and the pointer is changed into a stop pointer 71 which includes a stop flag 72 (see FIG. 6).

Referring next to FIG. 6, by repositioning the stop pointer 71 and stop flag 72 adjacent a desired stop time and activating the appropriate pointing device control, a stop time (as shown, 6:00 P) appears in a stop field 74. Also, upon completion of the start/stop time selection along the time line 60, the start pointer 67/start flag 68 and the stop pointer 71/stop flag 72 are changed into a double headed indicator 80 (see FIG. 7). Additionally, a busy bar 82 appears in the busy bar area 62.

Referring next to FIG. 7, the present invention is shown in the edit start/stop time mode which may appear after selecting a stop and start time or upon selection of an edit command. A time frame 4 P–6 P, which has been previously selected for the event, is marked by the double headed indicator 80. To edit the event start and/or stop time, a user may use appropriate drag and drop manipulations to drag the indicator 80 along the time line 60 as desired. Alternatively, the user may change the start and/or stop time in the start box 70 and/or the stop box 74 by using a keyboard.

Referring to FIG. 8, another embodiment of the present invention is shown in use with an on-line calendar program. An "Event Definition" screen 84 has been opened by the user. Various information is provided for convenience (such as a current month calendar 86) as well as required scheduling areas such as date 83, time 85, subject 87, and event description 88. A first time line 90 and a second time line 92 are provided in the time area 85 for selection of start/stop times, respectively. In particular, first time line 90 is used for selection of a start time as indicated by a start pointer 94, while the second time line 92 is used for a stop time as indicated by a stop pointer 96. As similarly done with the previous two embodiments, upon selection of a start/stop time, the appropriate time appears in a start field 98 and/or a stop field 100. Similarly, start/stop pointers and flags (not shown) may be used to signal the user what is to be done when a pointer is moved into the time area 85, as previously described with respect to FIGS. 2–7.

The pointers 94 and 96 are connected by a bar 102 to show the event as a scheduled entity. A user may drag the bar 102 using conventional drag and drop manipulations to change the start/stop times. Additional events already scheduled may be shown such as, for example, by busy bars 104 and 106 on the time lines 90 and 92.

Therefore, by utilizing the present invention, a user is able to select a start time and/or a stop time by merely pointing to the appropriate time on a time line with a mouse pointer and clicking. Information flags may be attached to or replace the standard system pointer to assist the user in the selection process and to serve as reminders for what is expected/required. As a result of the present invention, time selection is both quick and easy with a minimum number of required steps. In addition, the use of a changing pointer to provide instructions to the user is a helpful and more efficient use of user interface technology.

Figure 9:
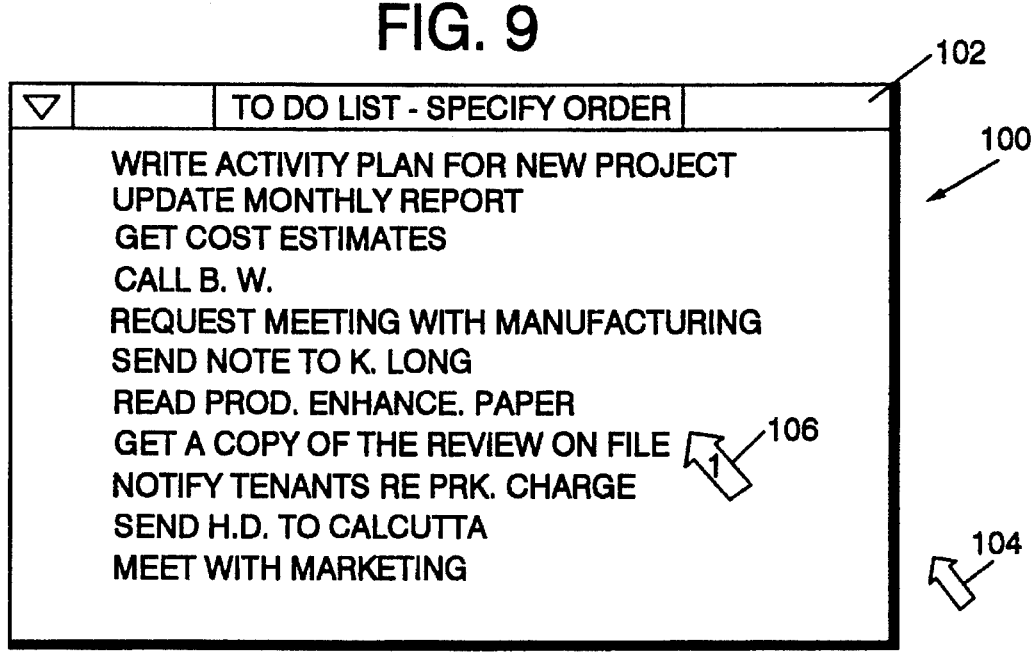
FIGS. 9–11 illustrate a still further embodiment of the present invention.
Figure 10:
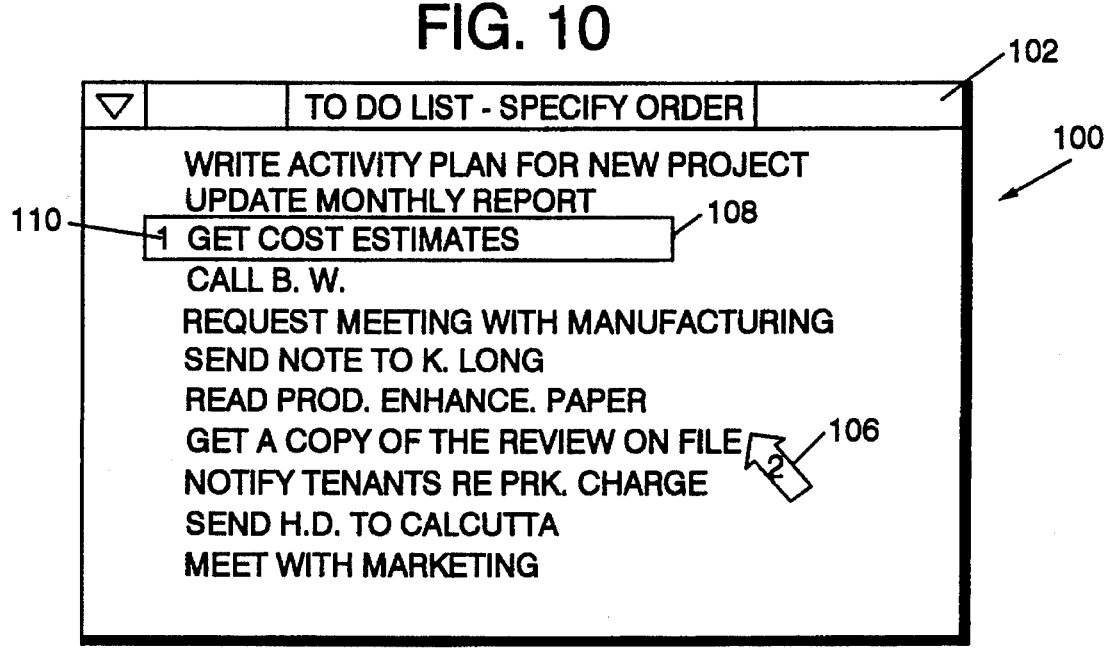
Figure 11:
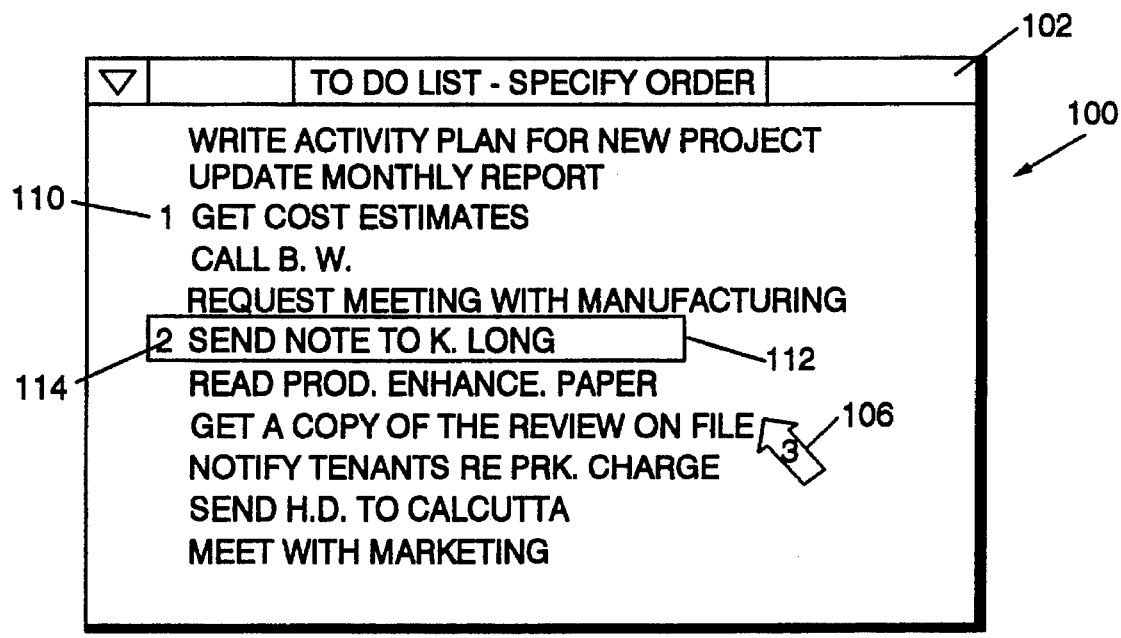

Referring to FIGS. 9, 10, and 11, a further embodiment of the present invention is illustrated. Referring first to FIG. 9, a specific function within a software application on a computer is presented in a panel 100. The function as shown in FIG. 9 is, for example only, a to-do list or priority order specifying function 102. A system pointer 104 such as from a mouse pointing device may be provided for direct manipulation techniques.

Upon moving the system pointer 104 within the panel 100, the pointer 104 is changed into a numbered priority pointer 106 with, for example, a numeral "1" therein to indicate that the first priority item is to be selected. Referring next to FIG. 10, the first priority item has been selected by moving the priority pointer 106 to the desired item "Get Cost Estimates" and activating the pointing device. The first priority item is then highlighted, as indicated by enclosure 108, and the appropriate priority sequence numeral 110 is added (numeral 1 for first priority). Simultaneously, the numbered priority pointer 106 is changed to include a numeral "2" to indicate that the next or second priority item is to be selected.

Referring to FIG. 11, the user has selected "Send Note to K. Long" as the second priority item. The numbered priority pointer 106 was positioned thereon and the pointing device activated as previously described. The second priority item is now highlighted as indicated by enclosure 112 and labelled with an appropriate priority sequence numeral 114 (the numeral 2 for second priority). The numbered priority pointer 106 is simultaneously changed to include a numeral "3" to indicate that the next or third priority item is to be selected. By continuing this process, all items in the list can be labelled with an appropriate priority sequence numeral. Upon completion, the user may then select an option to reorder the list in priority sequence numeral order. Alternatively, the list of items may be automatically ordered during or after the prioritizing as described above.

Thus, by utilizing the present invention, a user is provided with helpful information on what is expected/required. The changing pointer is useful in providing such information and one skilled in the art will readily identify further uses thereof.

Although the present invention has been described with respect to specific preferred embodiments thereof, various changes and modifications may be suggested to one skilled in the art and it is intended that the present invention encompasses such changes and modifications as fall within the scope of the appended claims.

What we claim is:

1. An improved method for directly selecting and signalling a start time and a stop time for a new event being scheduled by a user on an electronic calendar of a data processing system which includes a pointing device, comprising the steps of:
    positioning a pointer associated with the pointing device in a predesignated time selection area of the calendar;
    automatically displaying user oriented instructions on said pointer upon entrance of said pointer to said selection area;
    selecting a desired start time with said pointer from a time line of the electronic calendar for the event being scheduled;
    automatically displaying new user oriented instructions on said pointer subsequent to selecting said start time; and
    selecting a desired stop time with said pointer from said time line of the electronic calendar for said event.

2. The method of claim 1, further comprising the step of:
    automatically placing a start flag at said start time along said time line after said step of selecting said start time.

3. The method of claim 2, further comprising the step of:
    changing said start time by dragging and dropping said start flag along said time line with the pointing device.

4. The method of claim 1, further comprising the step of:
    automatically placing a stop flag at said stop time along said time line after said step of selecting said stop time.

5. The method of claim 4, further comprising the step of:
    changing said stop time by dragging and dropping said stop flag along said time line with the pointing device.

6. The method of claim 1, further comprising the step of:
    automatically placing a representation of said start time in a start time field adjacent said time line after said step of selecting said start time.

7. The method of claim 1, further comprising the step of:
    automatically placing a representation of said stop time in a stop time field adjacent said time line after said step of selecting said stop time.

8. A data processing system for directly selecting and signalling a start time and a stop time for a new event being scheduled by a user of an electronic calendar associated with the data processing system, comprising:
    means for positioning a pointer associated with the pointing device in a predesignated time selection area of the calendar;
    means for automatically displaying user oriented instructions on said pointer upon entrance of said pointer to said selection area;
    means for selecting a desired start time with said pointer from a time line of the electronic calendar for the event being scheduled;
    means for automatically displaying new user oriented instructions on said pointer subsequent to selecting said start time; and
    means for selecting a desired stop time with said pointer from said time line of the electronic calendar for said event.

9. The data processing system of claim 8, further comprising:
    means for automatically placing a start flag at said start time along said time line after said step of selecting said start time.

10. The data processing system of claim 9, further comprising:
    means for changing said start time by dragging and dropping said start flag along said time line with the pointing device.

11. The data processing system of claim 8, further comprising:
    means for automatically placing a stop flag at said stop time along said time line after said step of selecting said stop time.

12. The data processing system of claim 11, further comprising:
    means for changing said stop time by dragging and dropping said stop flag along said time line with the pointing device.

13. The data processing system of claim 8, further comprising:
    means for automatically placing a representation of said start time in a start time field adjacent said time line after said step of selecting said start time.

14. The data processing system of claim 8, further comprising:
    means for automatically placing a representation of said stop time in a stop time field adjacent said time line after said step of selecting said stop time.

* * * * *